(12) United States Patent
Lake

(10) Patent No.: US 6,950,594 B2
(45) Date of Patent: Sep. 27, 2005

(54) METHOD OF ATTACHING AN OPTICAL FIBER TO A FLEXURE

(75) Inventor: Rickie C. Lake, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 10/157,412

(22) Filed: May 29, 2002

(65) Prior Publication Data

US 2003/0174999 A1 Sep. 18, 2003

Related U.S. Application Data

(60) Provisional application No. 60/365,087, filed on Mar. 18, 2002.

(51) Int. Cl.[7] .................................................. G02B 6/00
(52) U.S. Cl. ...................................... 385/137; 385/136
(58) Field of Search ............................ 385/88–94, 136, 385/137

(56) References Cited

U.S. PATENT DOCUMENTS

| | | | | |
|---|---|---|---|---|
| 4,488,773 A | * | 12/1984 | Wagner | ........................ 385/12 |
| 4,711,388 A | * | 12/1987 | Winter et al. | ................ 228/148 |
| 5,109,466 A | * | 4/1992 | Seike et al. | .................. 385/137 |
| 5,692,086 A | * | 11/1997 | Beranek et al. | ................ 385/94 |
| 6,415,087 B1 | * | 7/2002 | Yang et al. | .................. 385/123 |
| 6,427,046 B1 | * | 7/2002 | Bickford et al. | ............ 385/138 |
| 6,574,411 B2 | * | 6/2003 | Seguin | ........................ 385/137 |

\* cited by examiner

*Primary Examiner*—Daniel Stcyr
*Assistant Examiner*—Daniel A. Hess
(74) *Attorney, Agent, or Firm*—Marshall, Gerstein & Borun LLP

(57) ABSTRACT

A method of creating a solder joint between a flexure platform and an optical glass fiber, including pre-treating the flexure platform to be solderable, metalizing the optical fiber at the location to be soldered, engaging the pre-treated flexure platform to the metalized area of the optical fiber, and subjecting the engaged flexure and fiber to induction energy to create the desired solder joint therebetween without harming the optical fiber with excessive heat.

25 Claims, 3 Drawing Sheets

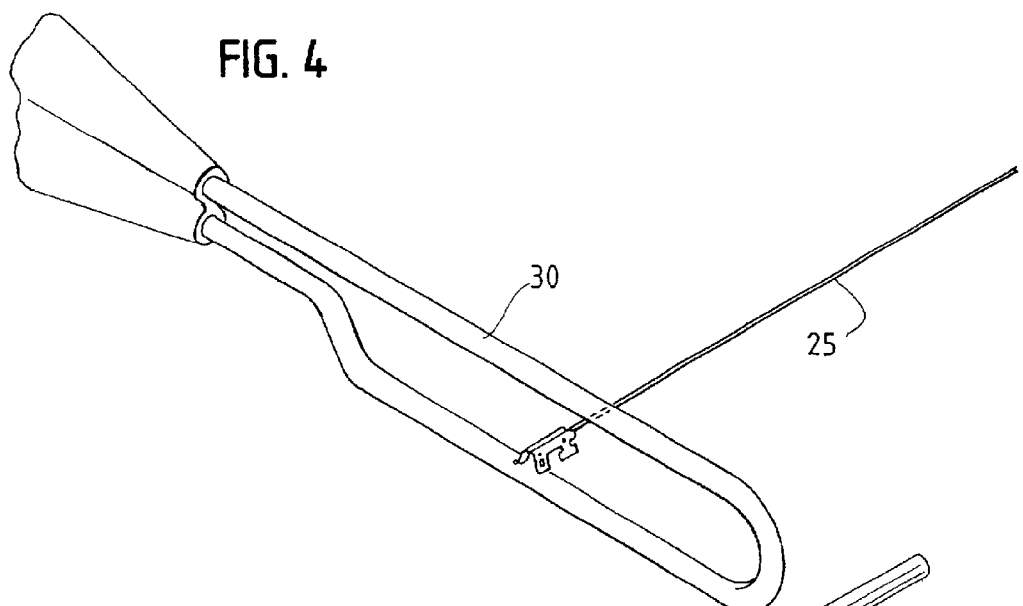
FIG. 4
FIG. 5
FIG. 6
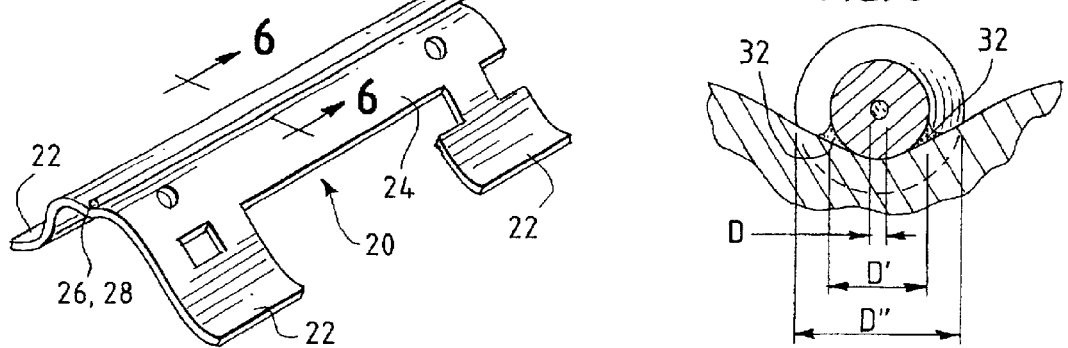
FIG. 7
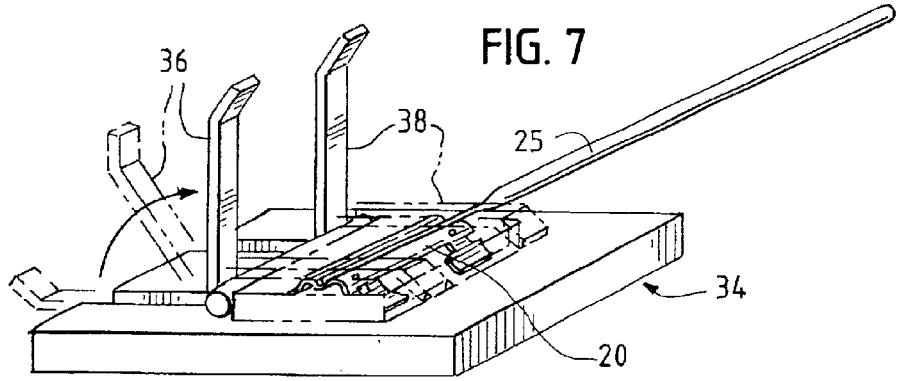

METHOD OF ATTACHING AN OPTICAL FIBER TO A FLEXURE

REFERENCE TO RELATED APPLICATION

This application is based on U.S. Provisional Application No. 60/365,087, filed Mar. 18, 2002.

FIELD OF THE INVENTION

This invention relates generally to the soldering of flexures to optical fibers for use in optical telecommunications applications, and more particularly to induction soldering of a pre-treated flexure member to a metalized optical fiber.

BACKGROUND OF THE INVENTION

So-called flexures, i.e., small solderable metallic platforms, are used at the ends of optical fibers, such as in manufacturing optical telecommunications components, for support, alignment, and connection purposes. For example, a flexure platform, such as in the form of a flexible four-legged clip member, is connected to an optical fiber and used to orient and align the fiber end to other components, such as to lenses, receiver diodes, and transmitter devices. Prior methods used to connect flexures to optical fibers included hot air or hot gas soldering, as well as hot plate soldering. Such prior soldering methods would require the use of lower melting point solders due to the exposure of the entire optical fiber to excessive heat from the soldering process. However, problems are created when using such lower melting point solders, because over the life of the electronic component, the soldered connection of components can undergo unwanted metallurgical creep, inasmuch as the solder connection is not sufficiently strong. Further, hot plate soldering was disadvantageous because of the difficulty in fixturing and clamping the flexure member and optical fiber relative to the hot plate without at the same time causing undue heat concentration in the optical fiber. Further, there are always safety concerns present for the operator when using a hot plate soldering approach. Also, such prior soldering methods took excessive lengths of time for both preparation and completion, thereby substantially reducing production economies.

There has been an ongoing need for an improved soldering technique that permits rapid soldering of flexures to optical fibers without heat damage of the fiber, and which soldering technique can be rapidly achieved.

BRIEF DESCRIPTION OF THE DRAWINGS

FIG. 4 is a perspective view depicting the components of FIG. 1 as fixtured, and the presence of an induction soldering coil, with the holding pocket fixture removed for clarity;

FIG. 5 is an enlarged view of the soldered assembly of the flexure and optical fiber;

FIG. 6 is a cross-sectional view taken along lines 6—6 of FIG. 5;

FIG. 7 is a perspective view of a holding pocket fixture for clamping the optical fiber, via non-metallic, non-heat conducting holder pins (shown in solid lines in their open, unclamped position, and in phantom lines in their clamped position), to the flexure member.

DETAILED DESCRIPTION OF THE INVENTION

Figure 1:
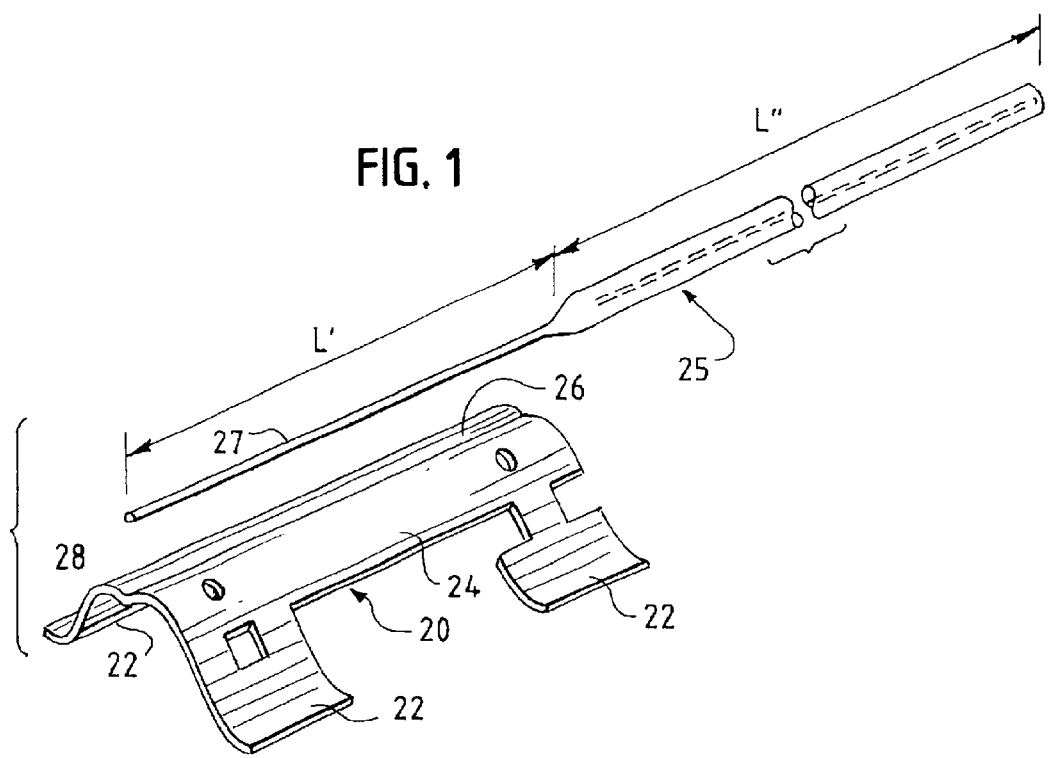
FIG. 1 is an exploded perspective assembly view of the flexure member and an associated optical fiber.

Having reference to the drawings, wherein like reference numerals indicate corresponding elements, there is shown in FIG. 1 an illustration of a so-called flexure member 20. A series of four flexible legs 22 extend downwardly from the respective outer corner edges of the main body portion 24 of flexure 20. Legs 22 are used to secure the flexure 20 in place, and at the correct orientation and alignment, when fixedly mounted within an electronic module (not shown). In use, the flexure 20 carries and supports the operating end of an optical fiber 25. The flexure 20 is oriented generally horizontally with the legs 22 extending outwardly and downwardly. It is preferably formed of KOVAR® material, but it can also be formed of Iron 43 and 17–7 ph steel. Depending upon the application, the flexure 20 can be formed to have a width of approximately 0.150 inch and a length of approximately 0.300 inch. However, it is recognized that the width can range up to as much as approximately 0.150 inch, and the length can vary as much as 0.600 inch. Typically, the flexure 20 is approximately 4 mils thick. The main body portion 24 of flexure 20 is formed so as to have a center valley section 26 on an upper surface of the flexure 20, down the middle of which is formed an etched channel 28.

Before being ready to accept an optical fiber 25 for subsequent mounting in a telecommunications component, e.g. optical module, the flexure 20 is first pre-treated. This is done in order to permit successful soldering by the induction soldering method of the present invention. More specifically, such pre-treating of the flexure 20 can comprise pre-tinning with a layer of so-called "80/20" solder (comprising 80% gold and 20% tin) into and along the etched channel 28 of flexure 20. In any event, such pre-tinning is preferably to be perfomed at the location where the soldering to an optical fiber is to occur. Such a pre-tinning with solder can be achieved by applying a layer of 80/20 solder paste atop the flexure 20, and then heating the flexure with solder paste in an oxygen free environment to re-flow, i.e. evenly spread and adhere, the solder to the flexure. Alternatively, one could employ a specially configured solder preform member. In that alternate method, a thin foil strip, i.e., solder preform, approximately 10 mils long and 2 mils wide, can be placed in the channel 28 of flexure 20, and then the preform and flexure are heated to re-flow the solder. In either method, the result is a flexure 20 with a solderable channel 28 ready to accept a mating optical fiber. Any remaining solder flux should be removed from the flexure after pre-tinning.

Figure 2:
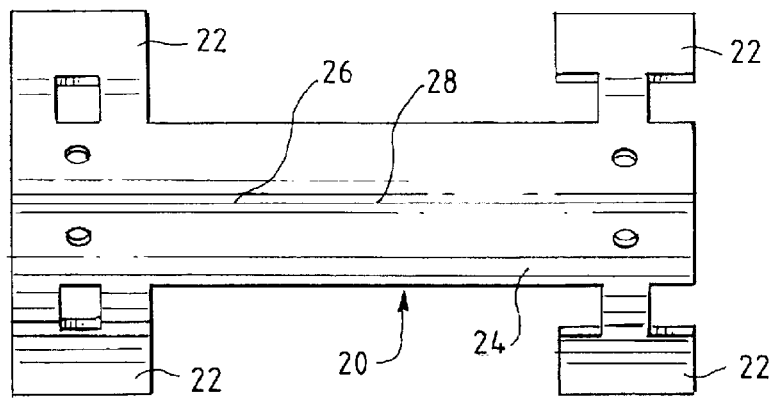
FIG. 2 is a top plan view of the flexure member of FIG. 1.
Figure 3:
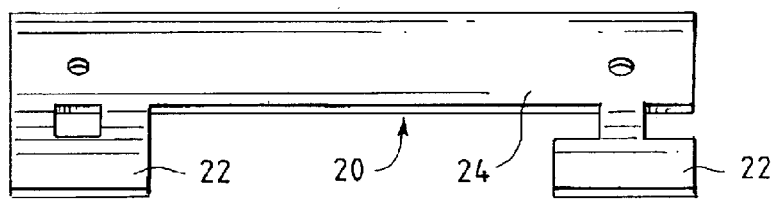
FIG. 3 is a side elevation view of the flexure member of FIG. 1.

Turning to FIG. 2, there is shown, besides the now pre-treated flexure 20, a glass optical fiber 25. Typically, when used for optical telecommunications applications, such a fiber 25 can be approximately 250 microns in overall diameter (D"), with an outer polymeric coating of approximately 125 microns in thickness, a secondary glass cover layer of approximately 125 microns in diameter (D'), and a central core glass strand of approximately 5 microns in diameter (D) (see FIG. 6). In any event, the flexure 20 and optical fiber 25 are preferably appropriately sized for the particular application at hand.

When used with the present invention, the optical fiber 25 is first pre-treated and prepared, preferably at just the local area where soldering is to occur. In commercially available form, the two-part glass fiber strand making up the optical fiber 25 is typically pre-coated with a polymeric coating.

That polymeric coating is stripped away (e.g., mechanically or thermally) at the location along its length where soldering is required; that location is typically at the outer end 27 of the optical fiber 25, and extends for approximately 14 to 18 mm, and preferably for approximately 16 mm. The resulting stripped length L of the optical fiber 25 (see FIG. 1) is then metalized for purposes of soldering. metalizing can be achieved by applying a thin adhesive layer coating of Titanium-Tungsten, or Chromium-Gold. Other suitable metal materials to use for such metalization include Chrome or Nickel-Chromium. Thereafter, as a solderable layer, a Nickel layer is applied on top of the thin adhesion layer. It is recognized that Platinum could also be used. That Nickel solderable layer is present to facilitate a satisfactory solder joint of the metalized optical fiber 25 with the flexure 20. Thereafter, as a protective layer, a thin Gold layer is placed on top of the Nickel or other solderable metal layer, so as to protect the same prior to its soldering. All of these metalizing layers can be applied, for example, through known metal evaporation techniques.

Instead of pre-treating the flexure platform, such as by the above-described pre-tinning methods, with solder paste, or a solder preform, the metalized end of the optical fiber 25 may alternatively be pre-tinned itself, such as with a suitable 80/20 solder coating.

Turning next to FIG. 5, there is shown the engaged physical assembly of metalized optical fiber 25 and flexure 20, as engaged against one another and now ready for the non-contact induction soldering in accordance with the present invention. To assure proper contact during soldering, there is seen in FIG. 7 how the flexure 20 is fitted into a small holding pocket fixture 34. The optical fiber 25 is seen as clamped (via non-metallic, non-heat conducting, e.g. ceramic, holder pins, 36, 38, preferably under downward pressure, as shown in their clamped position in phantom lines in FIG. 7) in place over the pre-tinned solder area 27 on the flexure 20. In this way, the metalized area of the optical fiber 25 is maintained in direct contact with the pre-tinned solder area 27 of the pre-treated flexure 20 and is ready for soldering.

Then, the water-cooled induction coil 30 of an associated induction soldering wand machine (not shown) is placed in position (see coil 30 shown in solid lines in FIG. 4) over the engaged and clamped assembly of the optical fiber 25 and the flexure 20. The fixture 34 has been omitted from FIG. 4 for clarity. A suitable induction soldering machine for use with the present invention is made by Seit Electronics, of Italy, as sold under the Minimax model name, operating at 900 KHZ.

Thereafter, a short induction cycle is triggered by switching on the induction energy source (not shown). Depending on the amount of energy utilized and the size and design of the induction coil 30, a typical cycle of some 5 to 9 seconds can be utilized for the present induction soldering method. Preferably, the induction soldering cycle is approximately seven and one-half (7½) seconds, with an initial four (4) seconds of a pre-gas, e.g. Nitrogen, is directed by local jets onto the solder site (to purge the area of oxygen), then one and one-half (1½) seconds of induction coil heating time is applied, followed by an additional nitrogen gas flow time of two (2) seconds to assure that no solder flux residue results.

Thereafter, the induction energy source is deactivated, and the induction coil 30 is removed. Then, the soldered parts comprising the joined assembly of flexure 20 and optical fiber 25, with solder fillets 32, can be removed from the fixture 34 to complete the soldering cycle.

Figure 8:
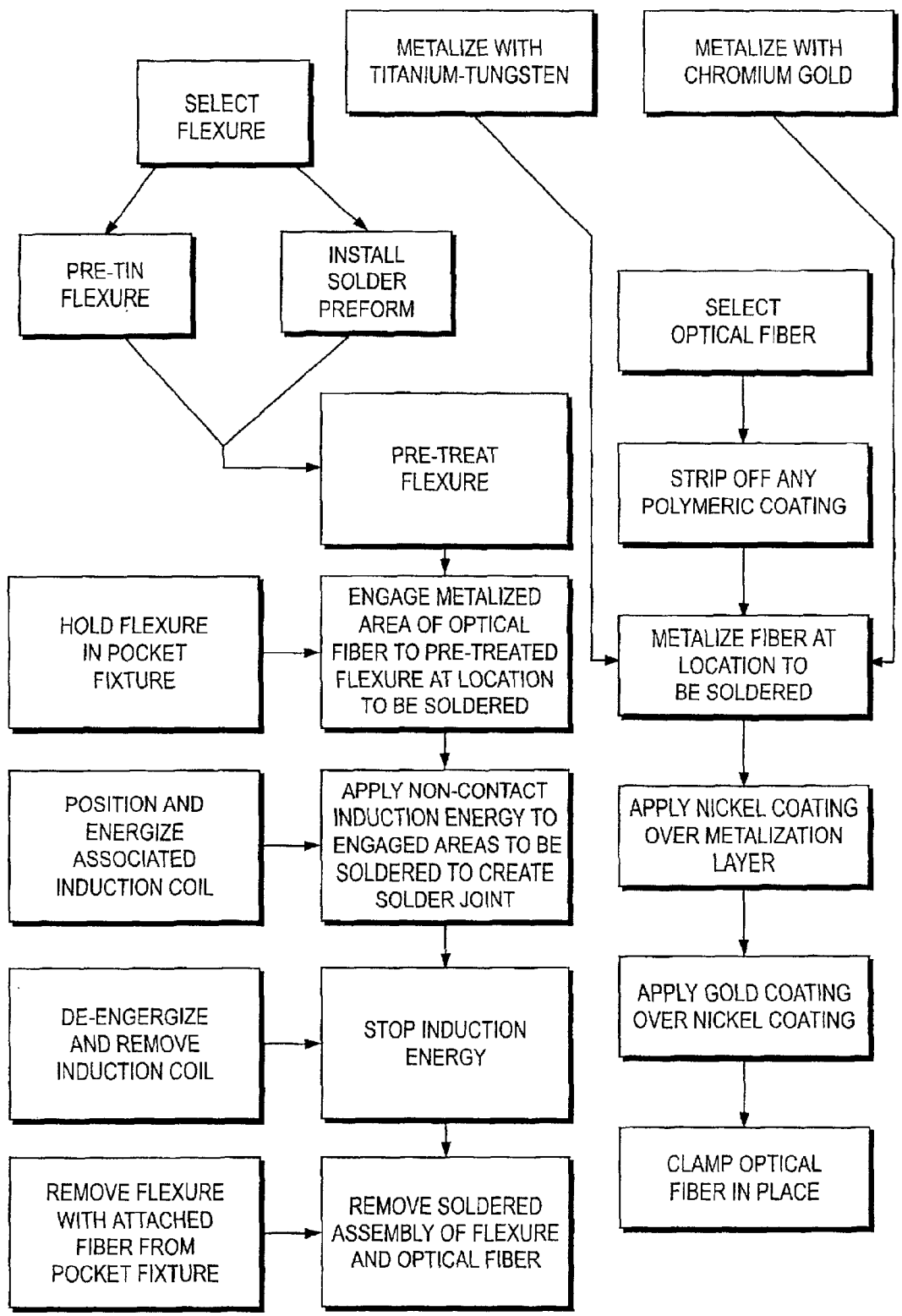
FIG. 8 is a flow chart of certain exemplary embodiments of the present inventive process.

The above-described method of the present induction solder operation is reflected in flow-chart form in FIG. 8.

Advantageously, the non-contact induction soldering process of the present invention does not create any heat damage to the optical fiber 25. This is because the optical fiber 25 is formed of glass, which does not undergo any induction energization because the induction soldering process only heats the associated metals involved, and thus, does not directly heat the glass itself, exploiting the non-reactivity of glass to the electromagnetic field of this induction soldering process. This lack of heating of the glass fiber is a significant advantage over the known prior art soldering methods, where great care had to be taken to assure the associated glass fiber member and its protective polymeric coating was not damaged by the hot gas or hot plate soldering apparatus conventionally used.

Further, the present induction soldering technique is comparatively very quick. For example, a hot gas soldering technique would often take some 20 seconds to achieve a suitable heat and melt of the solder, primarily because of the low heat transfer rate of hot gas directed on a metal. However, the present induction soldering technique can achieve a satisfactory finished solder joint in only 7½ seconds, thereby giving an approximately 62.5% increase in speed over the prior art soldering techniques. The present induction soldering technique also results in a substantial improvement in solder joint quality, since higher melting temperature solder can be used, with better creep results.

Another advantage of the present invention is the substantial reduction in the amount of Nitrogen gas required, since the solder site is so localized, and is done more quickly, as compared to when a large hot plate is used for soldering. Further, the present invention advantageously results in a compact solder apparatus, instead of the large solder stations required in hot gas and hot plate solder techniques.

The optical fibers with soldered flexure as resulting from the techniques of the present invention can be used in fiber optic module applications, such as in so-called butterfly transmitters, butterfly receivers, and miniature modules, for example. Also, besides being used with solderable flexure platforms, such as flexure 20, the present induction soldering process can also be used to solder metalized optical fibers to yet other type electronic components, such as to platforms, metalized ceramic components, and fiber feed through channels.

I claim:

1. Method of affixing by soldering an optical fiber to a flexure platform, comprising:

pre-treating a flexure platform to be solder ready;

stripping away any polymeric coating present off the optical fiber at an end length area required for soldering;

metalizing the stripped end length area of the optical fiber to form a metalized optical fiber;

placing the metalized optical fiber so that a metalized layer thereof is in engagement with the pre-treated flexure platform;

moving an induction coil in place adjacent the engaged flexure platform and optical fiber;

energizing the induction coil to melt the mating solder areas of the pre-treated flexure platform and metalized optical fiber so as to create a solder bond therebetween;

de-energizing the induction coil; and removing the soldered combination of optical fiber and flexure platform.

2. The method of claim 1, and the pre-treating of the flexure platform comprises one of pre-tinning the flexure platform with solder, and placing a solder preform onto the flexure platform.

3. The method of claim 1, and the step of metalizing the stripped end length area of the optical fiber further comprising:
coating the stripped area of the optical fiber for soldering with an adhesion layer;
coating the optical fiber's stripped area yet further with a solderable layer; and
coating the optical fiber's stripped area yet further with a protective layer.

4. The method of claim 3, and pre-tinning the metalized optical fiber at the area to be soldered.

5. The method of claim 3, and in coating the stripped area of the glass fiber for soldering with the adhesion layer, the adhesion layer is formed of one of Titanium-Tungsten and Chromium-Gold, chrome, and Nickel-Chromium.

6. The method of claim 3, and in coating the stripped area of the glass fiber for soldering with the adhesion layer, a solderable layer is formed of one of Nickel and Platinum.

7. The method of claim 3, and in coating the stripped area of the glass fiber for soldering with the adhesion layer, a protective layer is formed of Gold.

8. The method of claim 1, further comprising, after pre-treating the flexure platform, placing the pre-treated flexure platform in a holding fixture with the pre-treated surface thereof facing outwardly for engagement with the metalized layer of the melting optical fiber.

9. The method of claim 8, and the placing of the metalized optical fiber comprises clamping the metalized optical fiber against the flexure platform so that the metalized area engages the pre-treated portion of the flexure platform.

10. The method of claim 1, and the stripping away any polymeric coating present off the optical fiber at the end length area, the end length in a range of approximately 14 to 18 millimeters.

11. Method of non-contact induction soldering of optical fiber having a polymeric coating surrounding a glass interior to a flexure, comprising:
pre-treating the flexure to be solder-ready;
stripping away the polymeric coating from an end of the optical fiber to expose the glass interior, the glass interior including a secondary glass cover layer surrounding a central core glass strand;
pre-treating the exposed glass interior of the optical fiber by metalizing the exposed glass interior to form a metalized optical fiber;
engaging the pre-treated end of the metalized optical fiber to the pre-treated flexure at a location to be soldered; and
subjecting the engaged metalized optical fiber and flexure to induction energy sufficient to create a solder joint therebetween.

12. The method of claim 11, and in subjecting the engaged fiber and flexure to induction energy, the induction energy is localized relative to the location to be soldered.

13. The method of claim 11, and in pre-treating the flexure to be solder-ready, the pre-treating of the flexure includes pre-tinning the flexure.

14. The method of claim 11, and in pre-treating the flexure to be solder-ready, the pre-treating of the flexure includes installing a solder preform onto the flexure.

15. The method of claim 11, and the engaging of the fiber to the flexure comprises fixturing the flexure to present the pre-treated area outwardly, and clamping the fiber with metalized area of the fiber in direct engagement with the pre-treated area of the flexure.

16. The method of claim 11, and the subjecting to induction energy comprises locating an induction soldering coil proximate the engaged fiber and flexure, and energizing and de-energizing the coil to achieve the solder joint.

17. The method of claim 11, wherein the step of pretreating the exposed glass interior of the optical fiber further comprises:
applying an adhesion layer to the exposed glass interior of the optical fiber;
applying a solderable layer over the adhesion layer; and
applying a protective layer over the solderable layer.

18. The method of claim 11, wherein the step of pretreating the exposed glass interior of the optical fiber further comprises pre-tinning the exposed glass interior of the optical fiber.

19. The method of claim 11, and the stripping away the polymeric coating from the end of the optical fiber to a length in a range of approximately 14 to 18 millimeters.

20. Method of soldering an optical fiber having a polymeric coating to a flexure having a channel provided along an upper surface thereof, composing:
identifying an end of the optical fiber that is to be soldered;
stripping away the polymeric coating from the end of the optical fiber;
metalizing the stripped end of the optical fiber
pre-tinning the channel of the flexure;
aligning with the channel of the flexure the stripped end of the optical fiber that is to be soldered;
clamping the stripped end of the optical fiber that is to be soldered in place over the pre-tinned channel of the flexure, the stripped end of the optical fiber engaging the pre-tinned channel of the flexure;
orienting a source of induction energy in proximity to the aligned flexure and the area of the optical fiber that is to be soldered; and
activating the source of induction energy.

21. The method of claim 20, and the pre-tinning of the channel of the flexure, comprises pre-tinning with a layer of 80/20 solder.

22. The method of claim 20, and activating the induction coil for a period in a range of approximately 5 to 9 seconds.

23. The method of claim 22, the activating the induction coil for a period of approximately 7½ seconds.

24. The method of claim 20, and clamping the area of the optical fiber that is to be soldered over the pre-tinned channel of the flexure comprises using a plurality of non-conductive holder pins pressed against the optical fiber.

25. The method of claim 20, and the stripping away the polymeric coating from the end of the optical fiber to a length in a range of approximately 14 to 18 millimeters.

* * * * *

UNITED STATES PATENT AND TRADEMARK OFFICE
CERTIFICATE OF CORRECTION

PATENT NO.    : 6,950,594 B2  
DATED         : September 27, 2005  
INVENTOR(S)   : Rickie C. Lake It is certified that error appears in the above-identified patent and that said Letters Patent is hereby corrected as shown below:

<u>Column 6,</u>  
Line 20, delete "claim 11, wherein" and insert -- claim 11 and wherein --.  
Line 29, delete "composing" and insert -- comprising --.

Signed and Sealed this

Twenty-first Day of March, 2006

JON W. DUDAS  
*Director of the United States Patent and Trademark Office*